United States Patent
Alur et al.

(10) Patent No.: US 6,681,264 B1
(45) Date of Patent: Jan. 20, 2004

(54) IMPLIED MESSAGE SEQUENCE CHARTS

(75) Inventors: Rajeev Alur, Ardmore, PA (US); Kousha Etessami, New York, NY (US); Mihalis Yannakakis, Summit, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/579,188

(22) Filed: May 26, 2000

(51) Int. Cl.⁷ .................................. G06F 9/54
(52) U.S. Cl. ..................... 709/318; 703/17; 706/10; 345/440
(58) Field of Search ................. 709/310–315; 370/393, 392; 379/201; 706/10–14; 717/1; 714/38; 345/440

(56) References Cited

U.S. PATENT DOCUMENTS

| | | | | |
|---|---|---|---|---|
| 5,812,145 A | * | 9/1998 | Holzmann et al. | 345/440 |
| 6,052,455 A | * | 4/2000 | James | 379/201 |
| 6,122,356 A | * | 9/2000 | James | 379/201 |
| 6,147,994 A | * | 11/2000 | Duree et al. | 370/392 |
| 6,260,186 B1 | * | 7/2001 | James | 717/1 |
| 6,405,361 B1 | * | 6/2002 | Broy et al. | 717/1 |
| 6,415,396 B1 | * | 7/2002 | Singh et al. | 714/38 |
| 6,516,306 B1 | * | 2/2003 | Alur et al. | 706/10 |

OTHER PUBLICATIONS

Bordeleau et al., "UCM–ROOM Modelling: from Use Case Maps to Communicating State Machines," IEEE paper #0–8186–7889–5/97, pp. 169–178, May 1997.*

Grabowski, Jens, "The Standardization of Message Sequence Charts," IEEE paper #0–8186–4240–8/93, pp. 48–63, Aug. 1993.*

* cited by examiner

Primary Examiner—St. John Courtenay, III

(57) ABSTRACT

A system and method for determining whether a set of message sequence charts (MSCs) is realizable or safely realizable in an implementation is provided. The determination is made by analyzing the set of MSCs for the existence of unspecified, implied MSCs. If the set of MSCs can be realized in a deadlock-free automaton, then the set of MSCs is safely realizable. If the set of MSCs is realizable (no implied MSCs exist), a state machine can be synthesized from the set of MSCs. If the set of MSCs is not realizable, then implied, unspecified (partial) MSCs are produced. Also, given an undesirable MSC, the system determines whether the set of required MSCs implies the given undesired MSC.

15 Claims, 4 Drawing Sheets

IMPLIED MESSAGE SEQUENCE CHARTS

FIELD OF THE INVENTION

The invention relates generally to systems analysis and design, and more particularly to modeling using message sequence charts.

BACKGROUND

Message Sequence Charts (MSCs) are commonly used to describe design requirements for concurrent systems, such as telecommunications software. An MSC typically describes messages passed between participating concurrent processes in the system, abstracting away details like program variables and their values. An individual MSC corresponds to a single (partial-order) execution of the described system, and requirements specifications are often given as a set of MSCs depicting different possible executions. Requirements expressed with MSCs have formal semantics, and can be analyzed for, among other things, race conditions, timing conflicts, pattern matching and non-local choice. Since MSCs are typically used early in a design, any errors revealed during analysis of an MSC yields a high pay-off in the design effort.

Each process in a concurrent system has only a local view of the possible scenarios described by the different MSCs. (A local view means the process is only aware of events occurring on its process line.) Consequently, the intended behaviors in the different MSCs that describe a system can combine in unexpected ways to form unspecified but implied MSCs. These unspecified MSCs will exist as execution scenarios in a distributed implementation of the system, and such unspecified MSCs could represent unsafe or undesirable executions. No method exists, however, to detect whether such unspecified behaviors exist.

SUMMARY

The method according to the principles of the invention checks whether the behavior described in a set of message sequence charts (MSCs) is realizable as a set of possible executions of concurrent state machines. The set of MSCs is realizable when it represents all the executions of some system; that is, if the set does not imply any unspecified MSCs. If it is realizable, the MSCs are used to synthesize automata (state machines) that exhibit the desired behaviors. If the behavior is unrealizable, the method provides the implied MSCs.

The method according to the principles of the invention also determines whether the set of MSCs is realizable by a set of dead-lock free automata (safely realizable). If the behaviors are not safely realizable, the method provides implied, partial MSCs. These partial MSCs represent incomplete but implied executions, which can then be extended and completed by system designers. The designer can complete these partial MSCs and add them to the set of MSCs. The new set can then be checked for realizability and implied, partial MSCs. The process can be iterated until no implied MSCs exist or until the designer is satisfied. If the MSCs are safely realizable, they can be used to synthesize deadlock-free automata exhibiting the desired behaviors.

To efficiently determine whether a set of MSCs is safely realizable, the MSCs in the set are analyzed to identify events that are eligible to replace other identified events in the MSC set. For example, for an identified event on a given MSC in the set, it is determined whether some other event on some other MSC in the set can substitute for the identified event. If so, there must be an MSC that realizes the substitution. If that MSC does not exist in the set of MSCs, it is an implied but unspecified MSC. In that case, the set of MSCs is not safely realizable and the implied MSC is reported.

It may also be desirable to determine whether some unspecified MSC is implied by a set of MSCs. For example, when a scenario is known to be dangerous, the scenario can be checked directly to determine if the set of MSCs implies the scenario. To determine whether a given unspecified MSC is implied by a set of MSCs, the projection onto each process in the unspecified MSC is checked for existence in the set. The projection onto each process is the sequence of events for the process. If all the projections for each process in the unspecified MSC exist somewhere in the set of MSCs, the set of MSCs implies the unspecified MSC.

BRIEF DESCRIPTION OF THE DRAWINGS

The features of the invention will appear more fully upon consideration of the embodiments to be described in detail in connection with the accompanying drawings, in which.

DETAILED DESCRIPTION

System analysis according to the principles of the invention determines whether requirement specifications described as a set of message sequence charts (MSCs) are realizable or safely realizable in an implementation. The determination is made by analyzing the set of MSCs for the existence of unspecified, implied MSCs. Implied MSCs can exist in an implementation, although they are not specified in the requirements. If the set of MSCs is realizable (no implied MSCs exist), a state machine can be synthesized from the set of MSCs. If the set of MSCs can be realized in a deadlock-free automaton, then the set of MSCs is safely realizable.

A. Example Of An Implied MSC

Figure 1A:
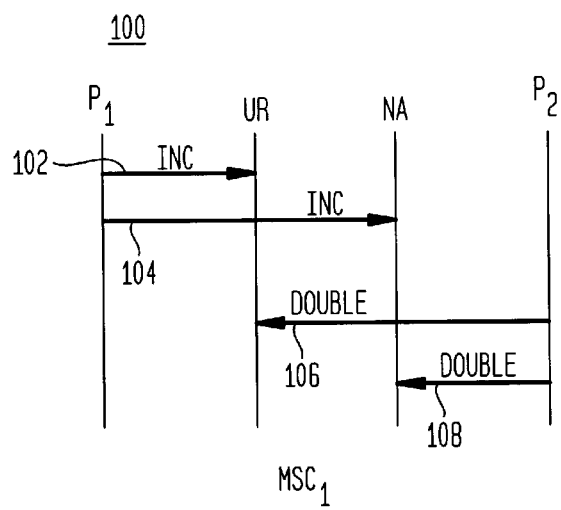
FIGS. 1A to 1C show message sequence charts illustrating implied scenarios.
Figure 1B:
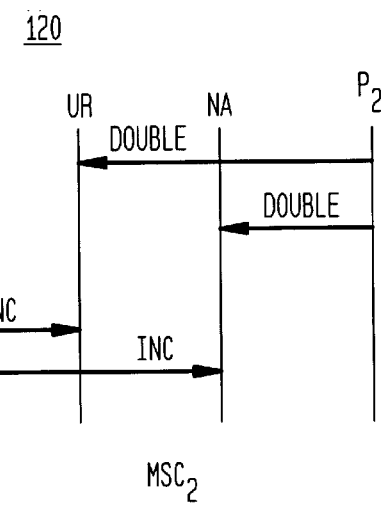
Figure 1C:
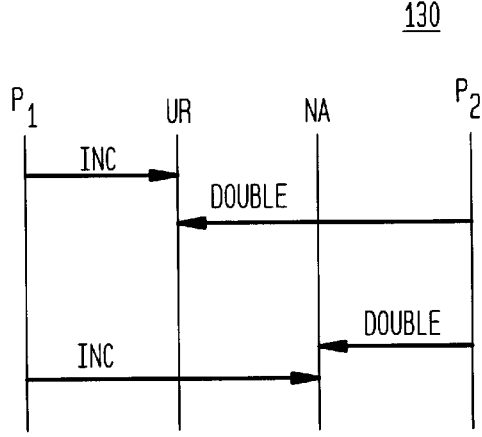

Implied MSCs arise when the intended behavior described by specified MSCs combine in unexpected ways. FIGS. 1A, 1B and 1C illustrate two simple MSCs 100 and 120 and an implied MSC 130, respectively. The MSCs describe behavior of a simple nuclear power plant. In the described behavior, two clients of the power plant, $P_1$ and $P_2$, perform remote updates on data used in the control of the nuclear power plant. In the control database, the variable UR controls the amount of Uranium fuel in the daily supply at the plant, and the variable NA controls the amount of Nitric Acid in the daily supply. The amounts of UR and NA must be equal to avoid a nuclear accident.

The MSCs 100 and 120 of FIG. 1A and FIG. 1B describe distinct transactions that can be performed by each of the clients, $P_1$ and $P_2$. The "inc" message denotes a client request to increment the fuel amount by one unit, while the "double" message denotes a client request to double the fuel amount. In the simple MSCs 100 and 120, the point where a message arrow leaves the time line of a process is the instance when the requested operation is issued. The point where a message arrives at the time line of its destination process is the instance when the requested operation is executed.

In the scenario described by the MSC 100 of FIG. 1A, $P_1$ first increments the amounts of UR and NA, and then $P_2$ doubles the amounts of both ingredients. In the scenario described by the MSC 120 of FIG. 1B, first $P_2$ doubles the UR and NA, and then $P_1$ increments both amounts. In both scenarios, after the processes complete the transactions, equal amounts of UR and NA are maintained in the daily supply. The MSCs of FIGS. 1A and 1B, therefore, appear to satisfy the requirement that the nuclear power plant maintain equal fuel amounts of UR and NA. As far as $P_1$ and $P_2$ are concerned, the power plant operates safely.

The MSCs of FIGS. 1A and 1B, however, imply the possibility of the scenario of $MSC_{bad}$ 130 shown in FIG. 1C. $MSC_{bad}$ 130 arises because, as far as $P_1$ and $P_2$ can locally tell, the scenario described in $MSC_{bad}$ 130 proceeds according to one of the scenarios specified by MSC 100 or MSC 120, shown in FIGS. 1A and 1B, respectively. For example, the process line of $P_1$ in $MSC_{bad\ 130}$ shows $P_1$ incrementing UR and then NA, which, as far as $P_1$ is concerned, is a safe transaction. For the process line of $P_2$, the amounts of UR and NA are doubled; a safe transaction as far as $P_2$ is concerned. The scenario described in $MSC_{bad}$ 130 taken as a whole, however, results in different amounts of UR and NA mixed into the daily supply, and in the potential for a nuclear accident. $P_1$, for example, increments UR and then $P_2$ doubles the amount. For NA, $P_2$ first doubles the amount and then $P_1$ increments it. This results in unequal amounts of UR and NA and an unsafe condition. Neither MSC 100 nor MSC 120 of FIGS. 1A and 1B respectively necessarily imply $MSC_{bad}$ 130, because for MSC 100 and MSC 120 the protocol can specify that one client updates the fuel levels first, followed by the other client. This protocol will not overcome the implied behavior of the MSCs 100 and 120 taken together.

B. Message Sequence Charts

In the above example, the behaviors of $P_1$ and $P_2$ were described with MSCs. MSCs are a known formalism for specifying concurrent systems, and a standard exists (ITU Z.120) for expressing MSCs. A message sequence chart (MSC) describes a scenario where processes communicate with each other. A scenario includes a description of the messages sent, the messages received and local events, as well as the ordering between them. Graphically, a vertical line represents each process, while a horizontal or slanted line represents a message from the sending process to the receiving process. Referring to the MSC of FIG. 1A, the MSC 100 includes processes $P_1$, UR, $P_2$ and NA and their respective process lines from top to bottom. The three processes exchange messages shown as arrows (102, 104, 106 and 108). The arrows show the direction of the message. When a process sends a message a send event occurs, and when a process receives a message a receive event occurs.

MSCs according to the principles of the invention can be expressed as a set of processes, $\rho = \{P_1, \ldots, P_n\}$. $\Sigma$ is the message alphabet for the MSC. The symbol [n] defines $\{1, \ldots n\}$. The label send(i,j,a) defines the event "process $P_i$ sends the message a to process $P_j$." Similarly, receive(i,j,a) denotes the event "process $P_j$ receives the message a from process $P_i$." The set $\hat{\Sigma}^s = \{\text{send}(i,j,a) \mid i,j,\in[n]\ \&\ a\in\Sigma\}$ is the set of send labels, the set $\hat{\Sigma}^R = \{\text{receive}(i,j,a) \mid i,j\in[n]\ \&\ a\in\Sigma\}$ is the set of receive labels, and $\hat{\Sigma} = \hat{\Sigma}^s \cup \hat{\Sigma}^R$ is the set of all event labels.

Figure 2:
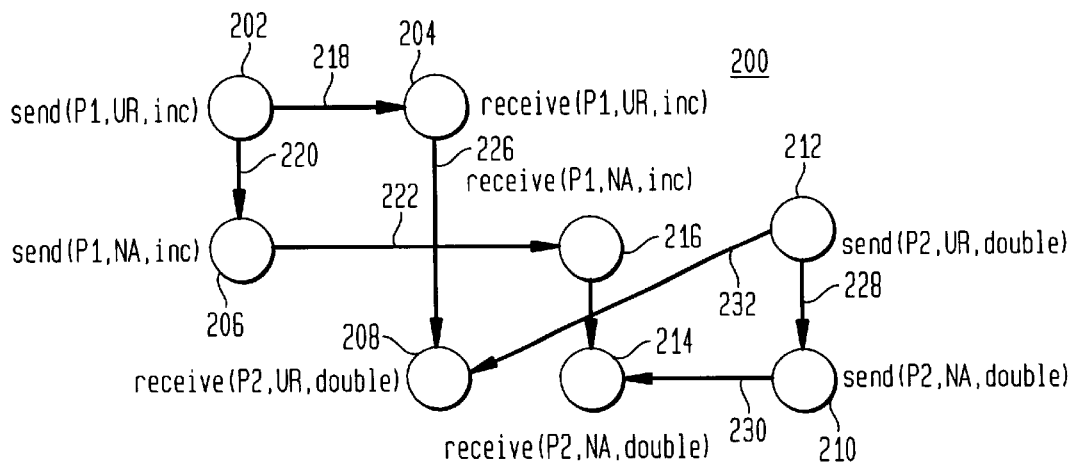
FIG. 2 shows a partial order execution graph.

The partial order 200 corresponding to the MSC 100 of FIG. 1A is shown in FIG. 2. The partial order is illustrated as a graph having eight nodes (202, 204, 206, 208, 210, 212, 214, and 216). The nodes are labeled with events corresponding to the events in the partial order. So, for example, a node 202 corresponding to the event where $P_1$ "sends" the "inc" message to UR. Arrows (218, 220, 222, 224, 226, 228, 230 and 232) join the nodes and direct a next possible event in the partial order. In this partial order, two arrows (218 and 220) leave the send(P1,UR,inc) node 202. One arrow impinges a node 204 representing a corresponding receive event. The other arrow 220 impinges a node 206 representing the next send event on the $P_1$ process line. The MSC 100 of FIG. 1A places no constraint on which event occurs first; therefore, neither does the partial order 200.

Using the above definition for an MSC M, a linearization of M is a string over the alphabet $\hat{\Sigma}$. Not all sequences of send and receive events are linearizations of MSCs. For example, in a linearization a message received must already have been sent. Words that define linearizations are characterized by well formedness and completeness. A word is well formed if all receive events have matching send events. A word is complete if all send events have matching receives.

In terms of the above definitions, for an MSC M, L(M) is the set of all linearizations of M. For a set m of MSCs, the language L(M) is the union of languages of all MSCs in M. The language L over the alphabet $\hat{\Sigma}$ is an MSC-language, if there is a set M of MSCs such that L equals L(M). Accordingly, an MSC language according to the principles of the invention includes only well-formed and complete words.

Because in an MSC corresponding to a word the events are only partially ordered, once a word is included in the language of an MSC all equivalent words that correspond to other linearizations of the same MSC must be included. Referred to as a closure condition, given a well-formed word w over the alphabet $\hat{\Sigma}$, the word's interleaving closure, denoted (w), contains all well-formed words v over $\hat{\Sigma}$, such that for all i in [n], w|i=v|i. w|$_i$ represents the projection of the word w that retains only those events that occur on process $P_i$ (that is, events of the type send(i,j,a) or receive (j,i,a)). A language L over $\hat{\Sigma}$ satisfies this interleaving closure condition, if for every $w \in L, (w) \subset L$. Since this closure condition is applicable to only well-formed words, matching of receive events is implicitly ensured.

C. Implication and Realizability

The processes of MSCs are implemented by automata $A_i$ that communicate with each other. The global system behavior of the communicating automata is captured by their product $A=\Pi_i A_i$. The set of automata implements a set of MSCs M, if the language of the automata contains the language of the MSCs (if $L(M) \subset L(\Pi_i A_i)$); that is, each MSC of M is an execution of the system of communicating automata. A set of MSCs M (weakly) implies another MSC M, if every system of communicating automata that implements M also implements (executes) M. A set of MSCs M is realizable, if there is a system of communicating automata, $\Pi_i A_i$, that implements it exactly: $L(M)=L(\Pi_i A_i)$. In other words, M does not imply any other MSCs.

In systems analysis, it may be desirable to determine whether some MSC M (for example an undesirable MSC) is implied by a set M of MSCs. To determine whether a given MSC M is implied by a set M of MSCs, the projection onto each process in the MSC M is checked for existence in the set M. The projection onto each process is the sequence of events for the process in the MSC. If all the projections for each process in the undesirable MSC M exist somewhere in the set of MSCs, the set of MSCs implies the undesirable MSC.

This method can be used to determine efficiently whether there exists a system of communicating automata that implements a set of given positive and negative requirements in the form of MSCs. Given a set M of required MSCs and a set N of forbidden MSCs, it can be determined whether there is a system of communicating automata that executes all MSCs in the set M and does not execute any MSC in the set N. Each MSC in the set N is checked to determine whether it is implied by the required set M. If M does not imply any MSC in the set N, then a set of automata synthesized from M (as set forth in Section E) executes all the required MSCs in the set M but does not execute any of the forbidden MSCs in the set N.

The weak realizability of a language can also be expressed as a closure condition, hereafter referred to as the weak realizability closure condition. A language L over the alphabet $\hat{\Sigma}$ satisfies the weak realizability closure condition for all well-formed and complete words w over $\hat{\Sigma}$, if for every process i there exists a word $v^i$ in L such that $w|_i = v^i$. When the weak realizability closure condition is satisfied, w is in L. In other words, if for every process $P_i$, the events occurring on $P_i$ in word w are consistent with the events occurring on $P_i$ in some word known to be in the language L, and w is well-formed, then w must be in L (w is implied). A language L over the alphabet $\hat{\Sigma}$ is weakly realizable if L contains only well-formed and complete words and satisfies the weak realizability closure condition. A set of MSCs, M, is weakly realizable only if L(M) satisfies the weak realizability closure condition.

In the example of FIG. 1, the language of the simple MSCs 100 and 120, L({MSC 100, MSC 120}), is not closed under the weak realizability closure condition. In particular, the word w, a linearization of $MSC_{bad}$ 130, given by send(P1, UR, inc)receive(P1, UR, inc)send(P2, UR, double)receive(P2, UR, double)send(P2, NA, double)receive(P2, NA, double)send(P1, NA, inc)receive(P1, NA, inc), is not in L({MSC 100, MSC 120}). Nevertheless, the projections $w|_{P1}$ and $w|_{P2}$ are consistent with both the MSCs, while the projection $w|_{UR}$ is consistent with MSC 100 and $w|_{NA}$ is consistent with MSC 120. Thus, any language satisfying the weak realizability closure condition and containing linearizations of MSC 100 and MSC 120 must also contain w.

Figure 3:
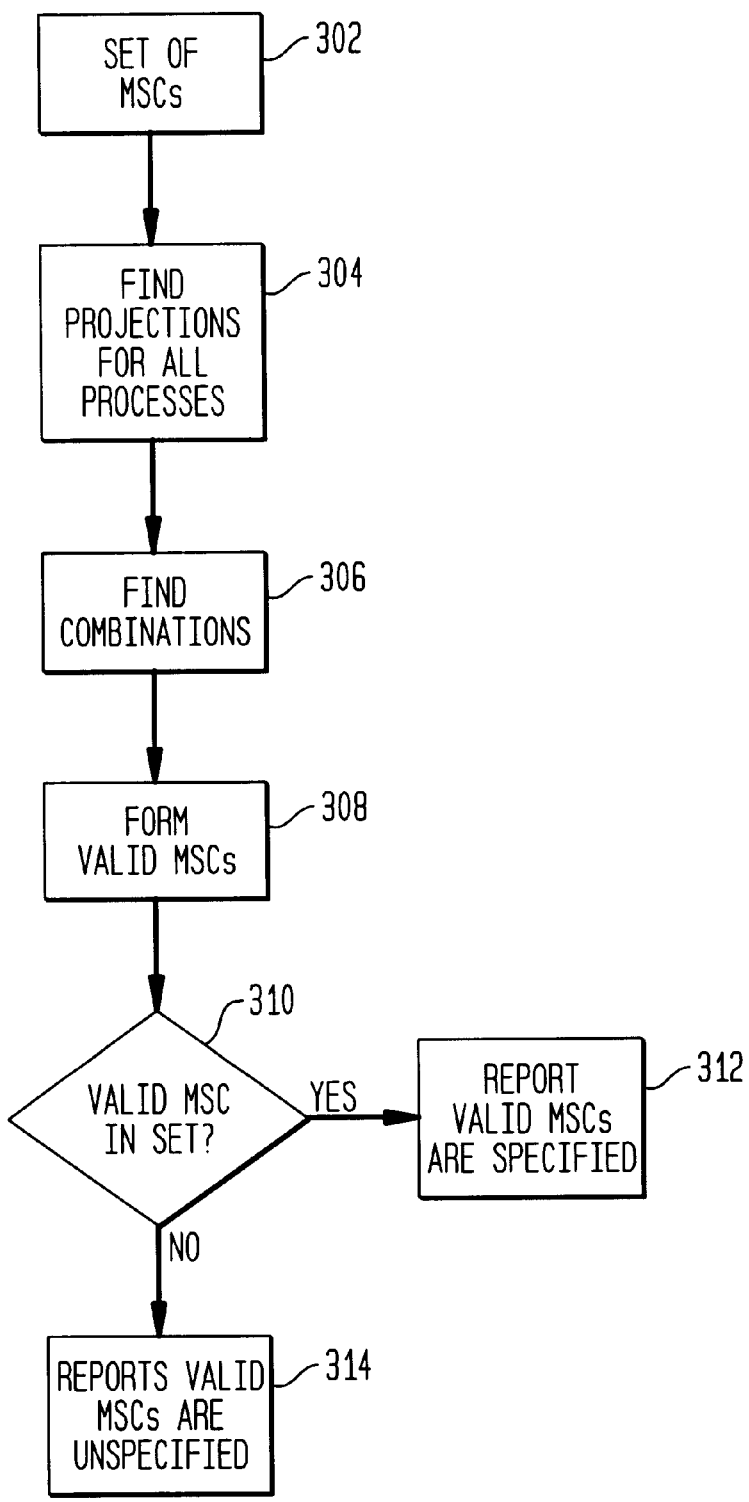
FIG. 3 illustrates a high-level flow chart for carrying out an exemplary method according to the principles of the invention.

FIG. 3 illustrates a flow chart 300 for determining realizability according to the principles of the invention. A set of MSCs is received for analysis, as at 302. To determine whether a set of MSCs is weakly realizable, the projections onto each process for each MSC in the set is found, as at 304. A projection onto a process is the sequence of events on the process line of the process. The possible combinations of projections for the set of MSCs are found, as at 306, and MSCs are formed from the combinations, as at 308. A combination includes one projection onto each process in the set of MSCs. Each of the formed MSCs are implied MSCs; however, they are not necessarily unspecified. To check whether the implied MSCs are unspecified, the implied MSCs are compared to the MSCs in the set of MSCs, as at 310. If an implied MSC does not exist in the set of MSCs, the implied MSC is reported as unspecified and the set of MSCs is reported as unrealizable, as at 314. Otherwise, the implied MSCs are reported as specified MSCs, as at 312.

D. Deadlock Free Realizability

Determining that a set of MSCs is realizable does not necessarily determine whether an automata realizing the set of MSCs will be deadlock-free. For a set $A_i$ of concurrent automata, the product $A = \Pi_i A_i$. A state q of the product A is in a deadlock state, if no accepting state of A is reachable from q. For example, a rejecting state in which all processes are waiting to receive messages that do not exist in the buffers is a deadlock state. The product A is deadlock-free, if no state reachable from its initial state is a deadlock state. A set of MSCs is referred to as safely realizable, if it can be realized in deadlock free automata.

To rule out deadlocks in implementations, a closure condition, hereafter referred to as the safe realizability closure condition, can be checked for satisfaction. For a language, L, pref (L) is the set of all prefixes of the words in L. A language L over $\hat{\Sigma}$ satisfies the safe realizability closure condition for all well-formed words w, if for each process i there is a word $v^i \in$ pref (L) such that $w|_i = v^i$, then w is in pref (L). This corresponds to satisfying the weak realizability closure condition, pref (L), without the requirement of completeness on w. Put another way, L satisfies the safe realizability closure condition only when, for all w, $v \in$ pref (L), and for all processes i, if $w|_i = v|_i$ and wx $\in$ pref (L) for some $x \in \hat{\Sigma}_i$, then if vx is well-formed vx is also in pref (L). A language L over the alphabet $\hat{\Sigma}$ is safely realizable, only if L contains only well-formed and complete words and satisfies the safe realizability closure condition. A set of MSCs, M, is safely realizable only if L(M) satisfies the safe realizability closure condition.

To efficiently determine whether a set of MSCs is safely realizable, the MSCs in the set are analyzed to identify events that are eligible to replace other identified events in the MSC set. For example, for an identified event on a given MSC in the set, it is determined whether some other event on some other MSC in the set can substitute for the identified event. If so, there must be an MSC that realizes the substitution. If that MSC does not exist in the set of MSCs, it is an implied but unspecified MSC.

The pseudo code set forth below implement an efficient method for determining safe realizability or returning the implied MSC. Given MSCs M={$M_1$ . . . , $M_k$}, where each MSC is a scenario over n processes $P_1$ . . . , $P_n$, a computer executing the exemplary code returns "YES" if M is safely realizable. If not, a computer executing the exemplary code returns an implied partial MSC, M' (a counterexample), which must exist as a partial execution of some MSC, but does not in M. The program stops when it finds a single missing partial MSC. In this exemplary code, M is expressed as a three dimensional table, with M[l][i][d] giving the label of the d'th event in the sequence of events on process Pi in MSC $M_l$. Thus M[l][i]=$M_l|_i$. | | M[l][i] | | denotes the length of the sequence $M_l|_i$.

```
proc SaftRealizabiliiy (M). ≡
foreach (s, t, i) ∈ [k] X [k] X [n] do
    T[s, t, i]: =min {c|(M[s][i][c]≠M[t][i][c])}
od;
/*T[s, t, i] gives the first position on */
/*process i where M_s and M_t differ */
Let ≦^s be the partial order of events in M_s.
foreach s ∈ [k] and event x in M_s do
    foreach process j ∈ [n] do
        U[s, x, j]: =
||M[s][j]|| + 1 if ∀ c x <^s M[s][j][c]
min {c|(x <^s M[s][j][c])} otherwise
od;
od;
/*U[s, x, *] gives the events of M_s dependent on x*/
foreach (s, t, i) ∈ [k] X [k] X [n] do
    c: = T[s, t, j];
x:= M[s][j][c]; x':  =M[t][j][c];
/* Determine if x' is eligible to replace x. */
/* If x' is a send event, it is always eligible. */
```

-continued

```
/* If x' = receive(i, j, a) then x' is eligible */
/* iff M[s][i][1...U[s, x, i]-1] contains more */
/* send(i, j, a)'s thanM[s][j][1... U[s, x, j]-1]*/
/* contains receive (i, j, a)'s. */
if x' is eligible to replace x then
    /* Find if some M_p realizes this replacement */
    if ∃ p ∈ [k] such that
        m[p][j][c] = ∈ x' and
        ∀j' ∈ [n] U[s, x, j'] ≤ T[s, p, j']
        then ()/* This eligible replacement exists*/
    else
        "M NOT SAFELY REALIZABLE"
        Missing Implied partial MSC given by ∀ j'
        M[s][j'][1...U[s, x, j'] − 1] and M[s][j][c]: = x'
        return;
    fi;
fi;
od;
"YES. M IS SAFELY REALIZABLE"
```

Figure 4:
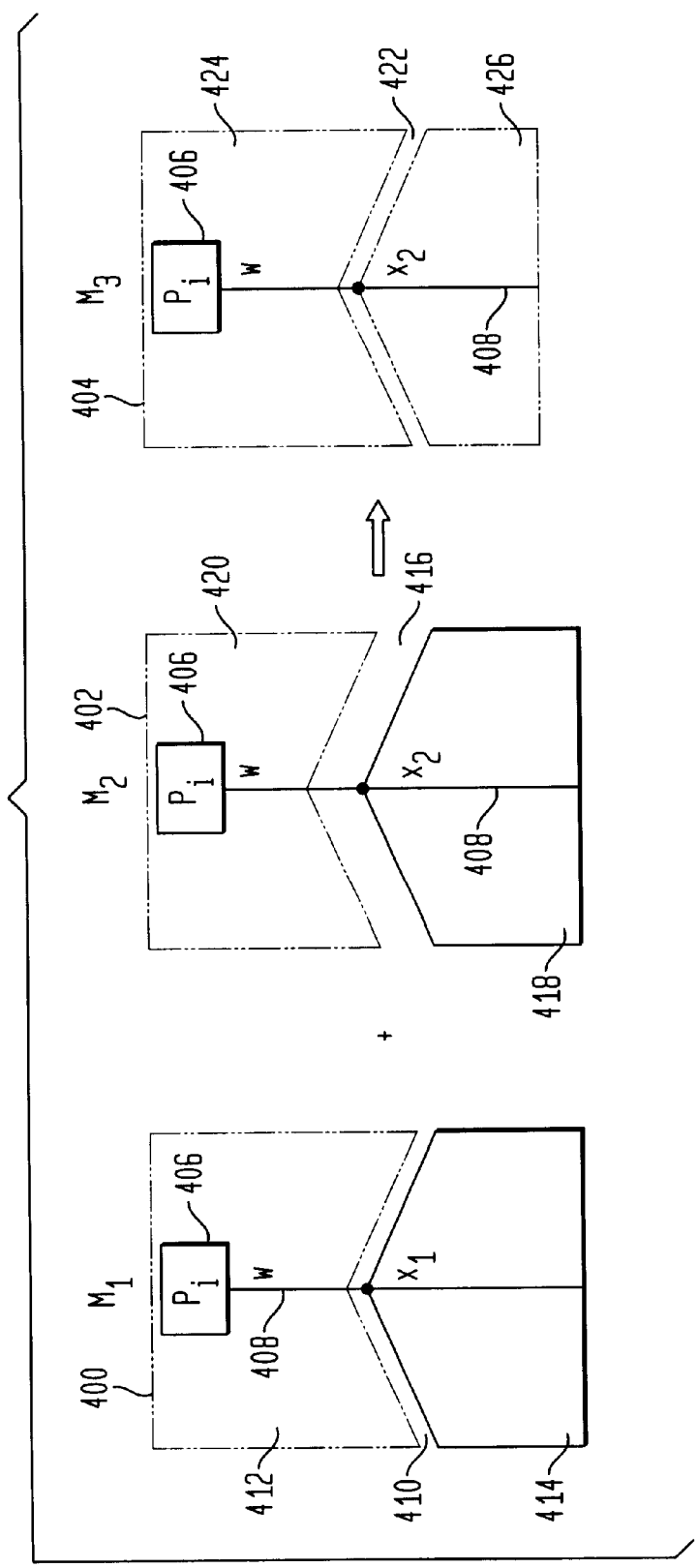
FIG. 4 shows exemplary substitution eligibility according to the principles of the invention.

In the above program, the safe realizability closure condition is violated only if, whenever there exists x and x' in $M_s$ and $M_t$, such that x' is eligible to replace x in the largest prefix on all processes of $M_s$ in which no event depends on x, then there is an $M_p$ which realizes this replacement. Eligibility according to the principles of the invention is explained with reference to the MSCs, M1, M2 and M3 (400, 402 and 404) of FIG. 4. Each of the MSCs contain a process Pi 406 and its process line 408. In M1 (400), a cut 410 separates divides M1 into two areas 412 and 414. All the sequences in the top area 412 are represented by the symbol "w". The first event below the cut 410 is event x1. In MSC M2 (402), a cut 416 separates the MSC into two areas 418 and 420. The top area 420, denoted with "w", contains all the same sequences over the same processes as the top area 412 in M1 (400). The first event, x2, in the bottom area 418 of M2 (402), however, is different that x1.

Assuming that x2 in M2 can substitute for x1 in M1, the MSC M3 (404) exists to realize this replacement. Like M1 and M2, M3 has a cut 422 dividing the M3 into two areas 424 and 426. The top area 424, denoted with "w", has the same sequences as the top areas in M1 and M2. The first event after the cut 422 is event x2. After event x2, however, the events differ from the events following x1 and x2 in M1 and M2 respectively, as shown by the dashed lines prescribing the bottom area 426. If M3 does not exist in the set of MSCs, it is an implied but unspecified MSC. The set of MSCs containing M1 and M2 would, in that case, be unrealizable as a deadlock free state machine.

In the exemplary code set forth above, eligible replacements that are not in the set of MSCs are reported. So, for example, M3 (404) in FIG. 4 can be reported as an implied, partial MSC that is unspecified in the set of MSCs. This partial MSC can be completed in accordance with design requirements and added to the set of MSCs.

Figure 5:
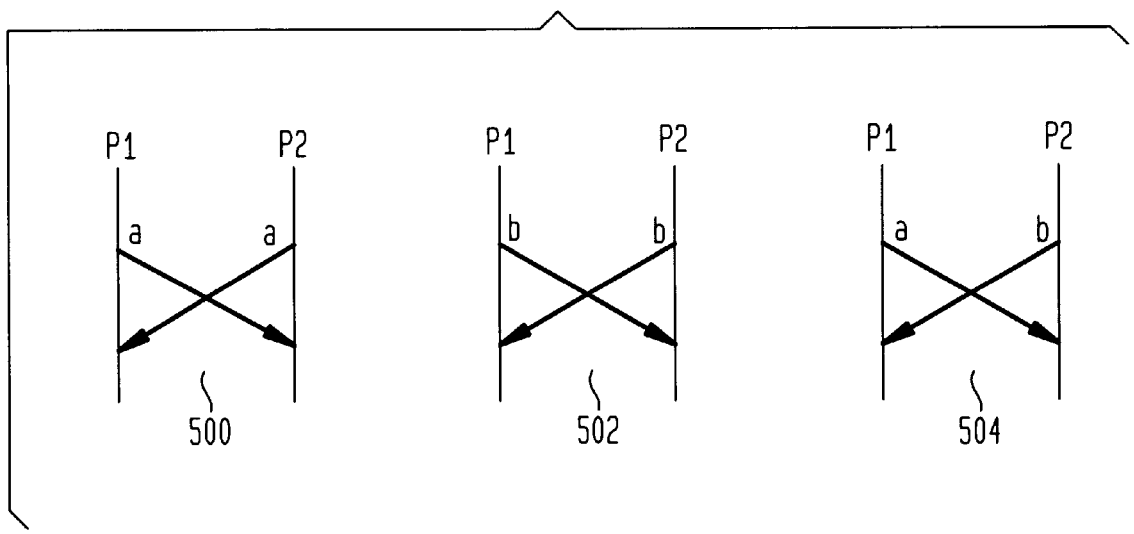
FIG. 5 illustrates partial MSCs according to the principles of the invention.

The MSCs of FIG. 5 illustrate partial MSCs (500, 502 and 504). Each MSC has two process, P1 and P2, that attempt to agree on a value (a or b) by sending each other their preferred message. In the first MSC 500, P1 and P2 send value a and are in agreement. In the second MSC 502, P1 and P2 send and agree on value b. From these two scenarios, the third MSC 506 can be inferred. In this scenario, P1 and P2 send conflicting values, and the scenario is incomplete (there is no agreement) as represented by the dotted lines. The third MSC 506 is a partial scenario. When such a scenario is reported in the design phase, the designer can complete the MSC and add it the set of MSCs specifying the requirements. The new set can then be analyzed for safe realizability.

The exemplary method described herein determines whether an MSC is realizable by a set of automata or deadlock free automata. This exemplary embodiment illustrates the application of the method to a system with a standard asynchronous architecture with arbitrary (i.e., unbounded and not necessarily first-in-first-out) message buffers between all pairs of processes. Determining implied MSCs according to the principles of the invention can also be implemented in other architectures. Architectural considerations like the queuing discipline and the synchrony of the processes effect the eligibility of an event to substitute for another event. So, for example, when queues are FIFO and when the message exchanges are synchronous (a sending process cannot continue until the message is received and implicitly acknowledged), the eligible events for substitution should account for the queuing discipline and messaging constraint.

E. Synthesis of State Machines

Once it is determined that a set M of MSCs is realizable, it is desirable to synthesize the automata $A_i$, such that $L(\Pi A_i)$ contains L(M). When M is safely realizable, the automata synthesis according to the principles of the invention yields an automata $A_i$ such that $\Pi_i A_i$ is deadlock-free. For the data structures described above, the string language of M corresponding to a process i is $L_i = \{M|_i | M \in M\}$. $A_i$ is an automaton having states $Q_i$ given by the set of prefixes, pref ($L_i$) in $L_i$, and transitions $\delta(qw,x, qw_x)$, where $x \in \Sigma$, and w, wx ∈ pref ($L_i$). The accepting states are $q_w$ for $w \in L_i A_i$ describes a tree whose accepting paths give $L_i$. Minimizing the $A_i$'s collapses the leaves and possibly other states and results in small automata. For $A_M = \Pi A_i$, $L(A_M)$ is the smallest product language containing L(M). If L(M) is weakly realizable, then $L(M) = L(A_M)$. If L(M) is safely realizable, then $A_M = \Pi_i A_i$ is deadlock-free.

F. Computer-based System

Figure 6:
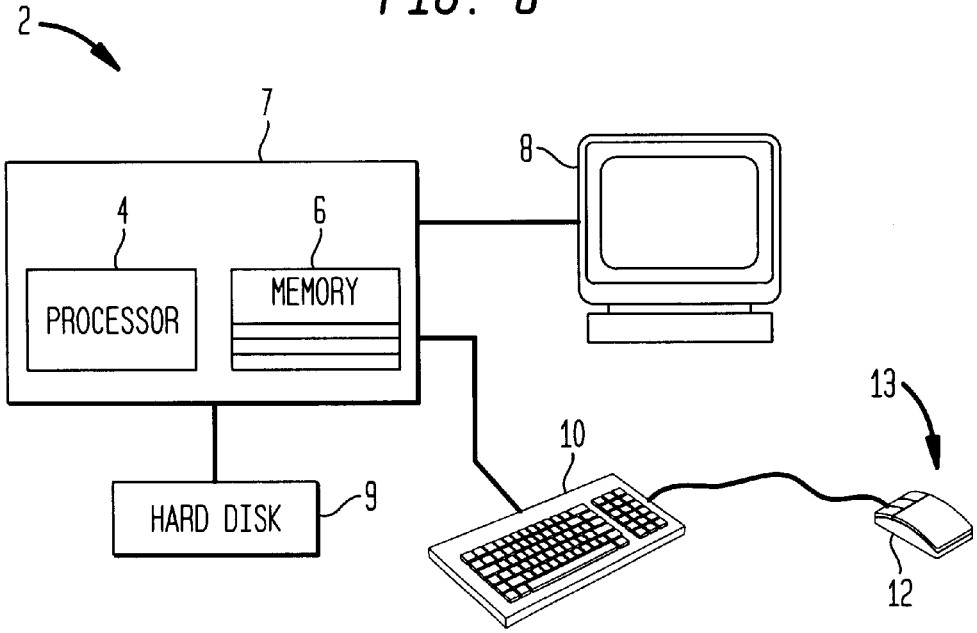
FIG. 6 illustrates a system for carrying out an exemplary method according to the principles of the invention.

FIG. 6 illustrates an exemplary embodiment of a computer-based system 02 for carrying out the method of the invention. The system 02 comprises a processing unit 07, a display screen terminal 08, input devices, e.g., a keyboard 10, and storage devices, such as a hard disk 09. The processing unit 07 includes a processor 04 and a memory 06. The memory 06 includes areas for storing, among other things, instructions for the processor 04. A selection device 12 is operable to select objects displayed on the display 08 when the system 02 operates with a graphical user interface (GUI). The screen 08, keyboard 10 and selection device 12 are collectively known as user interface devices. The system 02 utilizes a computer operating system and a windowing system for providing an interface between the user and the GUI. The operating system and the windowing system can be found resident in the memory 06.

Processor 04 is a general-purpose processor capable of executing a stored program routine that implements the verification method described herein. Memory 06 can consist of a single memory chip or multiple banks of memory, and the memory 06 can include Read Only Memory (ROM) and Random Access Memory (RAM). The storage device 09 is capable of storing and transmitting data and can consist of multiple storage units that are linked together. The storage device 09 may store, among other things, MSC representations, automata representations, projections onto processes and the output results produced by the method of the invention. The representations contain the information necessary for the system 02 to display, for instance, an automaton image on the system's 02 display terminal 08. These representations can also be kept in memory 06 and moved to storage 09. Representations and output results stored in the storage unit 09 are transmitted to processor unit 04 through an I/O bus (not shown).

As detailed above, the invention can be embodied in the form of methods and apparatuses for practicing those methods. The invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The invention can also be embodied in the form of program code, for example, in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

What is claimed is:

1. A method for analyzing concurrent systems having requirements specified as a set of message sequence charts (MSCs), comprising the steps of:

determining whether the set of MSCs is realizable by concurrent state machines;

reporting implied and unspecified MSCs when the set of MSCs is unrealizable; and synthesizing concurrent state machines realizing the set of MSCs when the set is realizable.

2. The method of claim 1 further comprising the steps of;

completing partial MSCs;

adding the partial MSCs to the set of MSCs to form a new set of MSCs; and repeating the determining, reporting, completing and adding steps until the new set of MSCs is realizable.

3. The method of claim 1, wherein the set of MSCs is safely realizable and the concurrent state machines realizing the set of MSCs are deadlock free.

4. The method of claim 3 wherein the determining step includes the steps of:

identifying events that are eligible to replace other events in the MSC set;

defining an implied MSC that realizes the substitution; and checking whether the implied MSC exists in the set of MSCs.

5. The method of claim 4 wherein the step of identifying events includes the steps of:

for a given process in a first MSC and a second MSC in the set of MSCs, identifying a first position on the given process where the first MSC has a different event than the second MSC;

determining all events in the first MSC that depends on the first event; and checking whether the second event can substitute for the first event.

6. The method of claim 1 further comprising the steps of:

determining whether any of the implied and unspecified MSCs are partial MSCs; and providing a prompt to define a completion of the partial MSCs.

7. The method of claim 1 wherein the determining step includes the further steps of:

identifying processes for the set of MSCs;

determining a projection onto each identified process for each MSC in the set of MSCs;

constructing a plurality of MSCs from the projections, wherein each of the MSCs in the plurality of MSCs includes one of the projections for each of the processes;

identifying valid MSCs from the plurality of MSCs; and determining whether any of the valid MSCs is unspecified in the set of MSCs.

8. The method of claim 7 wherein the plurality of MSCs includes an MSC for all combinations of projections, a combination having one projection for each process.

9. A system for aiding concurrent system design, comprising:

a memory for storing a set of message sequence charts (MSCs) and an instruction set;

a user interface, including an output device;

a processor responsive to the instruction set and the set of MSCs that determines when executing the instruction set whether the set of MSCs is realizable or unrealizable in concurrent state machines and causes the output device to report implied and unspecified MSCs when unrealizable and synthesize concurrent state machines realizing the set of MSCs when realizable.

10. The system of claim 9 wherein the set of MSCs is safely realizable and the concurrent state machines realizing the set of MSCs is deadlock free.

11. The system of claim 9 wherein the instruction set further causes the processor to determine whether any of the unspecified MSCs are partial MSCs and to output a prompt to define a completion of the partial MSCs on the output device.

12. A method of system design wherein requirements are specified by a set of message sequence charts (MSCs) and negative requirements are expressed by undesirable MSCs comprising the steps of determining whether the set of MSCs implies at least one of the undesirable MSCs, including forming a projection of each undesirable MSC on each process and determining whether the projections occur in the set of MSCs.

13. A machine-readable medium having stored thereon a plurality of instructions, the plurality of instruction including instructions that, when executed by a machine, cause the machine to perform a message sequence chart (MSC) analysis method of determining whether a set of MSCs is realizable by concurrent state machines and reporting implied and unspecified MSCs when the set of MSCs is unrealizable and synthesize concurrent state machines realizing the set of MSCs when the set is realizable.

14. The machine-readable medium of claim 13 wherein the set of MSCs is safely realizable and the concurrent state machines realizing the set of MSCs are deadlock free.

15. The machine-readable medium of claim 13 wherein the plurality of instructions further include instructions that, when executed by a machine, cause the machine to determine whether any of the implied and unspecified MSCs are partial MSCs and provide a prompt to define a completion of the partial MSCs.

* * * * *